N. NELSON.
SCREW CUTTING DIE.
No. 108,815.  Patented Nov. 1, 1870.
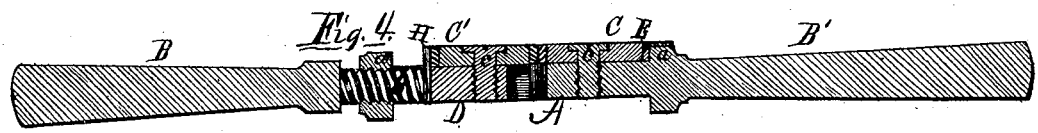
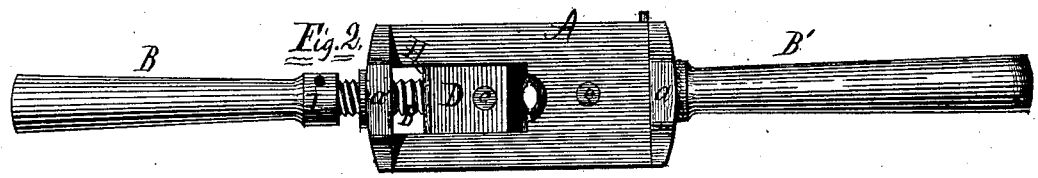
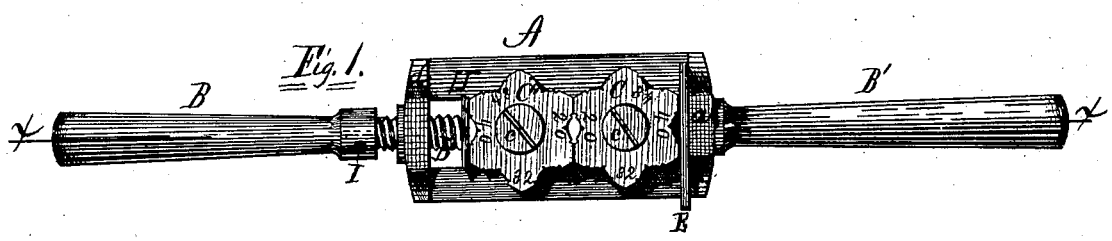
Witnesses:—
H. B. Bergen
O. R. Richards.
Inventor,
Nels Nelson,
by W. B. Richards,
Atty.

United States Patent Office.

NELS NELSON, OF GALESBURG, ILLINOIS.

Letters Patent No. 108,815, dated November 1, 1870.

IMPROVEMENT IN SCREW-CUTTING DIES.

The Schedule referred to in these Letters Patent and making part of the same.

I, NELS NELSON, of Galesburg, in the county of Knox and State of Illinois, have invented certain Improvements in Screw-plates, of which the following is a specification.

Nature and Objects of the Invention.

The invention relates to an improvement in tap or screw-plates of that class which has two pivoted dies provided with a number of corresponding cutting-faces for cutting different-sized screws.

In screw-plates of this description, one of the dies is pivoted to the face of the stock by a bolt or screw passing through the stock, the die revolving on the bolt as required. The other die is similarly pivoted to a movable plate which slides back and forth in a slot cut in the stock. In operation, any two of the corresponding faces are brought into the desired proximity so as to hold the screw-blank between them by a screw in one of the stock-handles which presses the die pivoted to the movable plate against the screw-blank, and the latter against the corresponding die pivoted to the stock. By turning the handles of the stock, the screw is cut by the pressure of the dies against the blank, in the usual way.

Experience has shown that however convenient the use of screw-plates so constructed, yet, from their want of rigidity during the process of cutting, they are defective, and turn out unevenly-cut screws. The cause of this defect is obviously the unequal pressure of the dies on the blank, and the tendency of the one pivoted to the stock to turn on its pivot, following the direction of the screw until brought up by the resistance of the other die. This of course causes that edge which presses most against the blank to cut deeper than the opposite edge, and an uneven screw is the result; and while the die attached to the plate is rigidly held against the blank, and the one attached to the stock is not, but turns slightly on its pivot, there must be an unequal pressure on the blank, especially when the point of resistance is the pivot on which the latter die turns.

To remedy this defect is the object of my improvement, and the invention consists in providing a key to be inserted between the shoulder of the stock and the die pivoted thereto, so as to equalize the pressure on the blank and securely hold the dies during the operation of cutting the screw-thread thereon.

Description of the Accompanying Drawing.

Figure 1 is a top plan or view of my invention.
Figure 2 is a bottom view or plan.
Figure 3 is a sectional view of fig. 1 on the line $xx$.
Figure 4 is a side elevation.

General Description.

A represents the stock, flattened at its central part, leaving shoulders, $a\,a$, as shown at figs. 3 and 4.

B B' represent the handles, one of which is attached to the stock A, and the other, B, is threaded and passes through a threaded hole in one end of the stock A, as plainly shown.

C C' represent the dies, which are made with a number of sides, each side on each die being cut with a different thread, and a side on each die being threaded to correspond with one on its fellow die.

The die C is pivoted to and rests on the solid part of the stock A. The die C' is pivoted by a bolt, $c$, to a plate, D, which slides in a slot in the stock A, as shown at fig. 2. The sides of the dies, C C', which are correspondingly threaded, may be similarly marked, as shown by the numbers 20 20, 40 40, &c., at fig. 1.

E is a key.
H is a plate.
I is a hole through the handle B.

The operation of my invention is as follows:

The die C is turned on the pivot $c$ until the desired side is toward the die C'; the key E is then slipped between the die and the shoulder $a$, which will prevent the die from turning when in operation. The die C' is now turned until the correspondingly-numbered side is brought adjacent to the die C; the plate H is then slipped up to the side of the die C', and the bolt to be cut or threaded inserted between the dies in the usual manner. Now, by slipping the end of a punch or other small rod into the hole I, the handle B may be turned, and its threaded end, acting against the plate H and sliding the plate D and die C', will bind the bolt being cut between the dies C C', as desired.

The dies C C' may have any number of faces or cutting-sides which will bring two sides always opposite to each other.

Claim.

I claim—

For the purposes of preventing the dies from turning and for supporting the pivots on which they turn, the plate H and key E, interposed respectively between the die-plate C' and the end of the screw B, and between the die-plate C and the shoulder $a$, substantially as set forth.

NELS NELSON.

Witnesses:
J. J. TUNNICLIFF,
H. H. BERGEN.